United States Patent
Guala et al.

(10) Patent No.: US 12,151,719 B2
(45) Date of Patent: Nov. 26, 2024

(54) UNIVERSAL FIT BACKING RING ASSEMBLY FOR RAILWAY AXLES

(71) Applicant: AKTIEBOLAGET SKF, Gothenburg (SE)

(72) Inventors: Giuseppe Guala, Pinerolo (IT); Paul Meaney, Werneck (DE); Maurizio Martinetti, Bruino (IT); Michael Zakrzewski, Harleysville, PA (US)

(73) Assignee: AKTIEBOLAGET SKF, Gothenburg (SE)

( * ) Notice: Subject to any disclaimer, the term of this patent is extended or adjusted under 35 U.S.C. 154(b) by 118 days.

(21) Appl. No.: 17/686,644

(22) Filed: Mar. 4, 2022

(65) Prior Publication Data
US 2022/0289256 A1 Sep. 15, 2022

(30) Foreign Application Priority Data
Mar. 12, 2021 (IT) .......................... 102021000005834

(51) Int. Cl.
*B61F 15/22* (2006.01)
*F16C 35/063* (2006.01)

(52) U.S. Cl.
CPC ............ *B61F 15/22* (2013.01); *F16C 35/063* (2013.01)

(58) Field of Classification Search
CPC ..... F16J 15/3268; B61F 15/22; F16C 35/063; F16C 19/386; F16C 2326/10; F16C 16/063
See application file for complete search history.

(56) References Cited

U.S. PATENT DOCUMENTS

| | | | |
|---|---|---|---|
| 5,456,475 A * | 10/1995 | Abraham | B01D 33/801 384/473 |
| 7,219,938 B2 | 5/2007 | Brister et al. | |
| 9,016,950 B2 | 4/2015 | Buchanan et al. | |
| 9,789,887 B2 | 10/2017 | Johansson et al. | |
| 2011/0064347 A1* | 3/2011 | Hubbard | F16C 35/063 384/564 |
| 2012/0195540 A1* | 8/2012 | Hubbard | B61F 15/22 384/572 |
| 2013/0230265 A1* | 9/2013 | Hubbard | F16C 19/386 384/459 |
| 2016/0223086 A1* | 8/2016 | Balsells | F16J 15/3212 |

* cited by examiner

*Primary Examiner* — Vishal A Patel
(74) *Attorney, Agent, or Firm* — J-TEK LAW PLLC; Scott T. Wakeman; Mark A. Ussai

(57) ABSTRACT

A backing ring assembly is for railway axles and includes a backing ring and an annular insert having L-shaped axial cross sections. The insert includes a sleeve portion fitted to a radially outer cylindrical surface of the backing ring, which delimits a first axial section thereof. The annular insert sleeve portion includes first and second axial sections hingedly connected by an intermediate, reduced thickness section designed to form a plastic hinge. The first axial section of the sleeve portion projects axially from the first section of the backing ring, which is provided with an annular projection designed to induce elastic deformation of the reduced thickness section to ensure that the second axial section of the sleeve portion is always coupled with the cylindrical outer surface of the backing ring first axial section by an interference fit.

9 Claims, 3 Drawing Sheets ns including the backing ring itself and an annular insert cooperating with the backing ring on the axial side opposite of the rolling bearing. Such a backing ring assembly should be reliable over time and capable of being used "universally" on worn axles with dimensions falling within the tolerance range specified by the AAR, regardless of the degree of wear of any particular axle.

The present invention therefore provides a backing ring assembly for railway axles having the features set out in the appended claims.

UNIVERSAL FIT BACKING RING ASSEMBLY FOR RAILWAY AXLES

CROSS-REFERENCE

This application claims priority to Italian Patent Application No. 102021000005834 filed on Mar. 12, 2021, the entire contents of which are fully incorporated herein by reference.

BACKGROUND OF THE INVENTION

The present invention relates to bearings, and more particularly to backing ring assemblies for bearings used for railway axles.

Backing ring assemblies are used for railway axles which are subject to wear, such that each backing ring assembly is preferably formed to be fitted to the axles universally, i.e., can be correctly mounted on and fastened to axles having a degree of wear varying within the tolerances prescribed by the Association of American Railroads ("AAR"). That is, each backing ring assembly should be able to fit about all railway axles, regardless of the degree of wear, as long as the wear is within the prescribed tolerances. Such universal backing ring assemblies are particularly suitable for use on the axles of freight trains, which are subjected to high loads, and thus require a very long service life which may include many maintenance operations.

A railway axle typically includes a journal, about which a rolling bearing is fitted as part of a railway axle box, and an enlarged section or "dust guard" section having a greater diameter and spaced axially from the journal. A curved connecting section extends between and connects the journal to the enlarged/dust guard section, as is known for example from U.S. Pat. No. 9,016,950. A backing ring for supporting the rolling bearing fits over and against the curved connecting section and has a counter bore that receives an adjacent end of the enlarged section of the axle.

Often, a stabilizing ring is provided which fits into a counter bore formed in the backing ring and cooperates with the enlarged section of the axle to reduce potential radial and circumferential movement between the backing ring and the curved connecting section. Such movement may be caused by looseness or "play" that may develop over a period of use as a result of wearing of the axle, in particular following repeated assembly and disassembly operations during axle maintenance. These stabilizing rings may include a first rigid annular component and a second elastic annular component that is interposed between the backing ring and the enlarged section of the axle to enable limited axial movement of the backing ring relative to the axle.

Providing a stabilizing ring to a backing ring is often complex to implement and may lose efficiency over time as a result of repeated deflections of the elastic annular component. In any case, stabilizing rings cannot be adapted as efficiently to partially worn axles with different degrees of wear, which cause substantially different degrees of play or looseness of the backing ring, even for axles falling within the specified range of tolerances.

SUMMARY OF THE INVENTION

The present invention is intended to provide a backing ring unit or assembly that overcomes the drawbacks in the prior art, that is easy and inexpensive to make, and that has a small footprint, i.e., requires minimal space for installation. In particular, one objective of the invention is to provide a backing ring assembly made of just two compo-

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
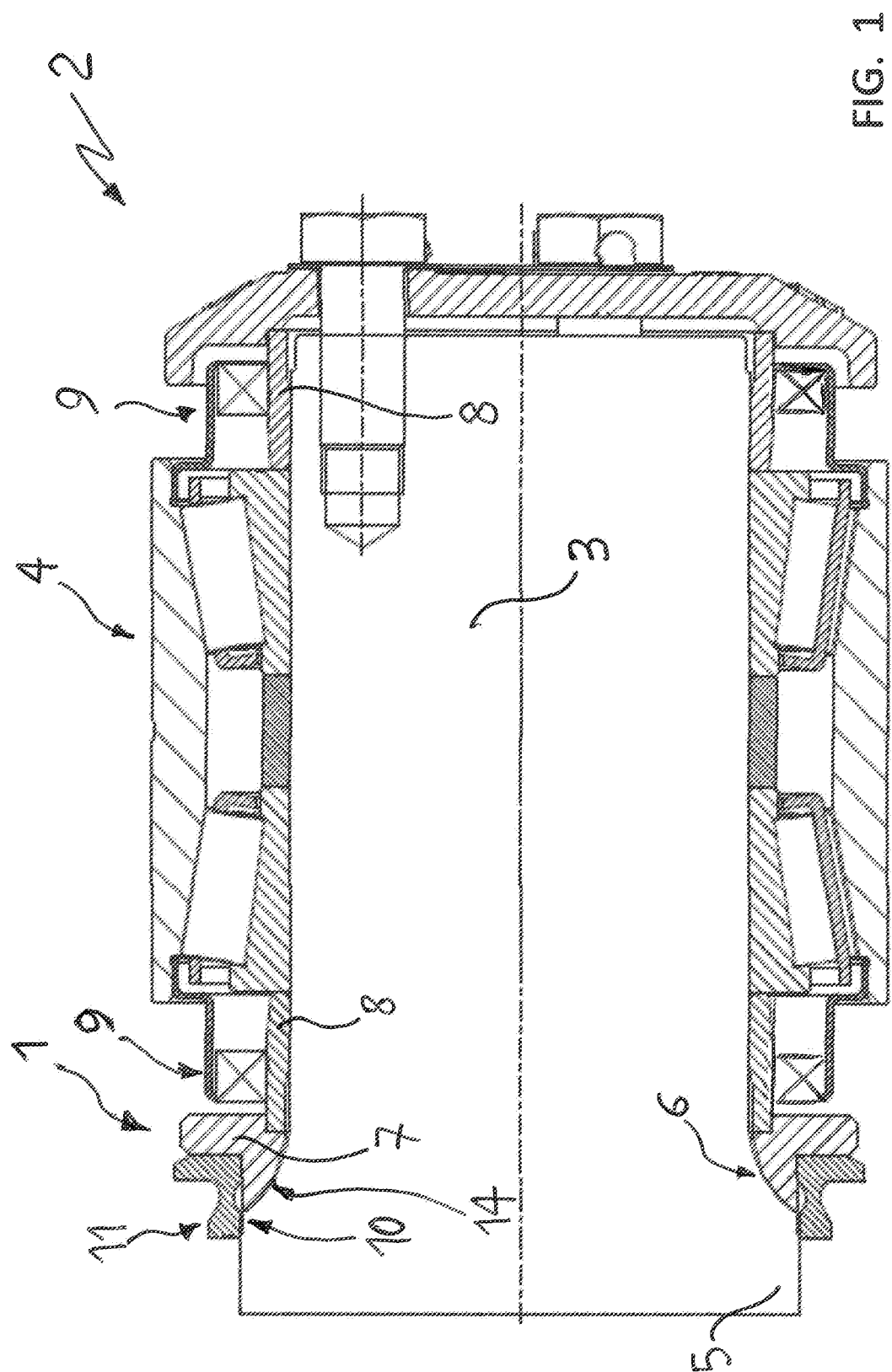
FIG. 1 is an axial cross-sectional view of an end of a railway axle of a known type including a conventional rolling bearing and provided with a backing ring assembly in accordance with the present invention.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-5 a backing ring assembly 1 in accordance with the present invention and basically comprising a backing ring 7 and an annular insert 10. The backing ring assembly 1 can be fitted "universally" (as discussed below) to a railway axle 2 (FIG. 1) that is generally formed in a known or conventional manner. As used herein, "universal fit" is intended to mean a coupling that enables the backing ring assembly 1 to be correctly mounted and fastened to, with equal efficiency, any railway axle 2 regardless of the degree of wear of the axle 2 within prescribed tolerances.

In use, the backing ring assembly 1 is designed to be fitted to a journal 3 of the railway axle 2 to act as the axial shoulder of a rolling bearing 4 mounted in a known manner on the journal 3. The rolling bearing 4 is part of a known railway axle box (remainder not shown for the sake of simplicity) that supports the axle 2, with the wheels of a railway wagon being fitted onto opposing, symmetrical journals 3 of the axle 2, only one of which is shown in FIG. 1. Opposite of each journal 3, the axle 2 has an enlarged section or "dust guard" 5 that is connected to the journal 3 by means of a curved connecting section 6.

Preferably, the backing ring 7 is made of a first steel (or other metal alloy) that is of high strength and substantially rigid and is designed to fit axially against the curved connecting section 6 of the railway axle 2. As such, the backing ring 7 is disposed axially between the portion of the journal 3 about which the rolling bearing 4 is mounted and the enlarged section 5 of the axle 2. In this location, the backing ring 7 receives axial loading or axial thrust forces from the rolling bearing 4 directly or, as in the non-limiting example shown, by means of a "wear" or spacer ring 8. Such a wear/spacer ring 8 is interposed axially between the bearing 4 and the curved connecting section 6 of the axle 2. In turn, the wear or spacer ring 8 acts as the axial shoulder for the backing ring 7, which is interposed axially between the spacer ring 8 and the shoulder formed by the connecting section 6 and the respective dust guard section 5 of the axle 2. Each spacer ring 8 (the exemplary embodiment depicted in FIG. 1 including two rings 8 that each "flank" the bearing 4 on opposing sides) is also referred to as a "wear" ring since the ring 8 is fitted with a gasket 9, as is generally known and depicted only schematically with a generic block in FIG. 1. As the sealing action of the gasket 9 may cause wear to the journal 3 over time, the journal 3 is protected by the rings 8 which experience the sealing wear of the gasket 9 and are thereafter replaceable.

Figure 3:
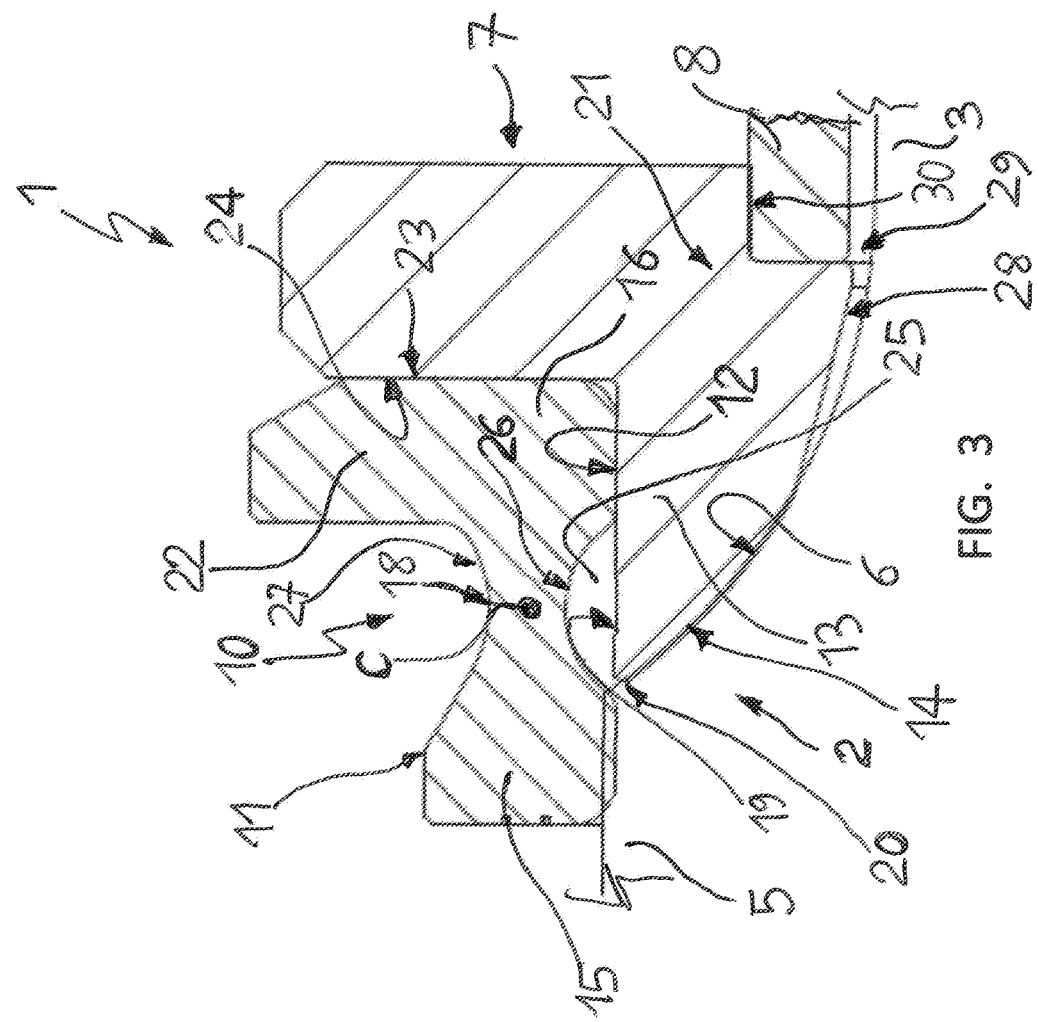
FIG. 3 is a broken-away, more enlarged view of a portion of FIG. 1, showing the present backing ring assembly.
Figure 2:
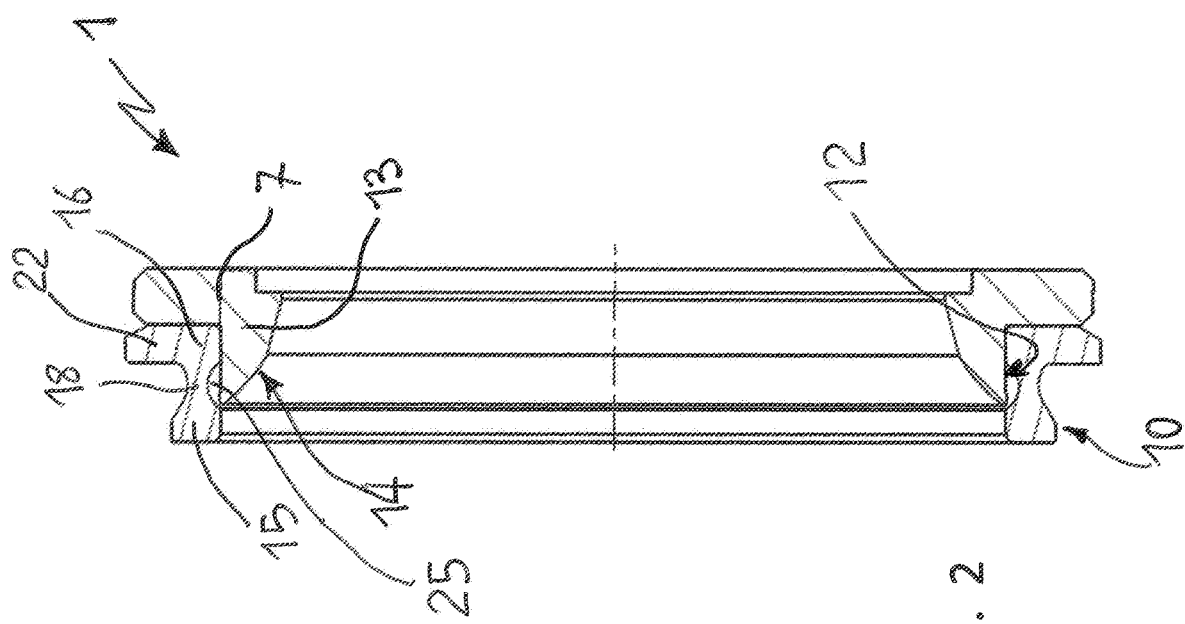
FIG. 2 is an enlarged axial cross-sectional view of the present backing ring assembly.
Figure 5:
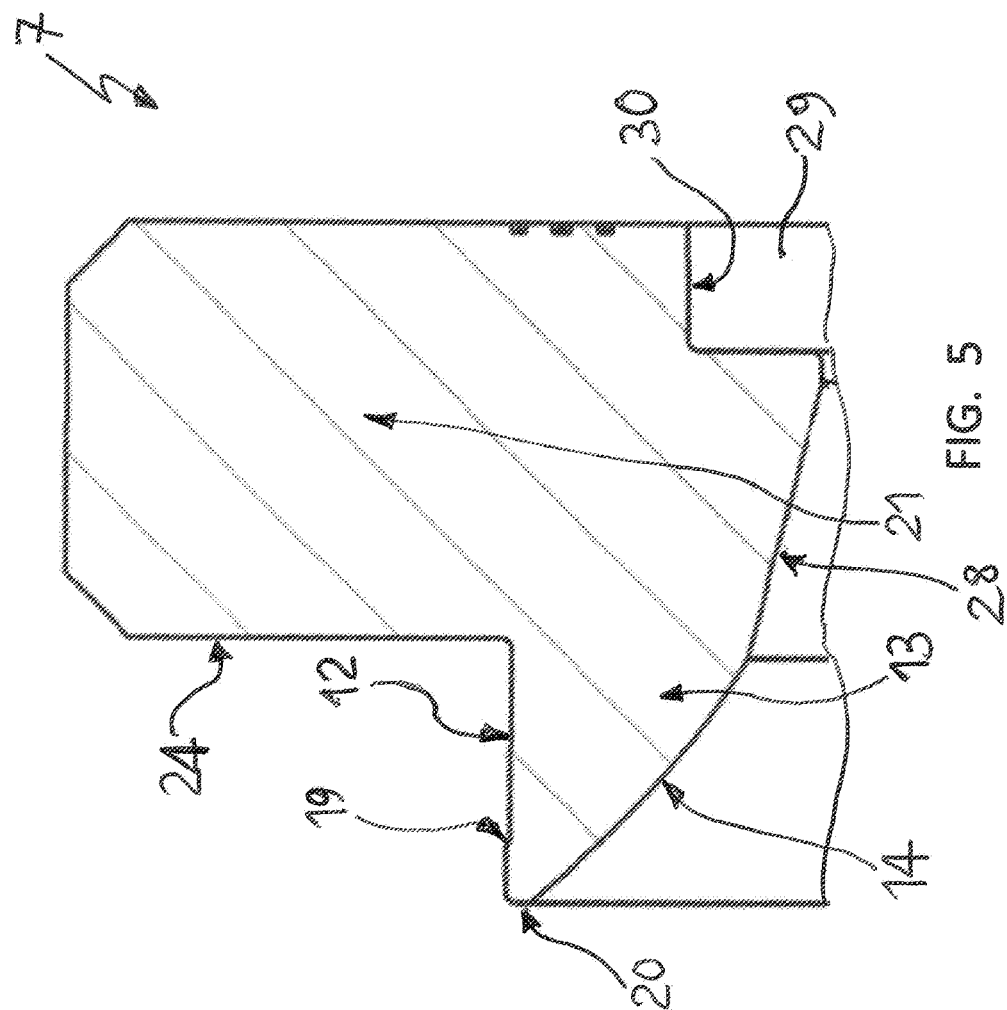
FIG. 5 is a broken-away, more enlarged axial cross-sectional view of a backing ring of the present backing ring assembly.
Figure 4:
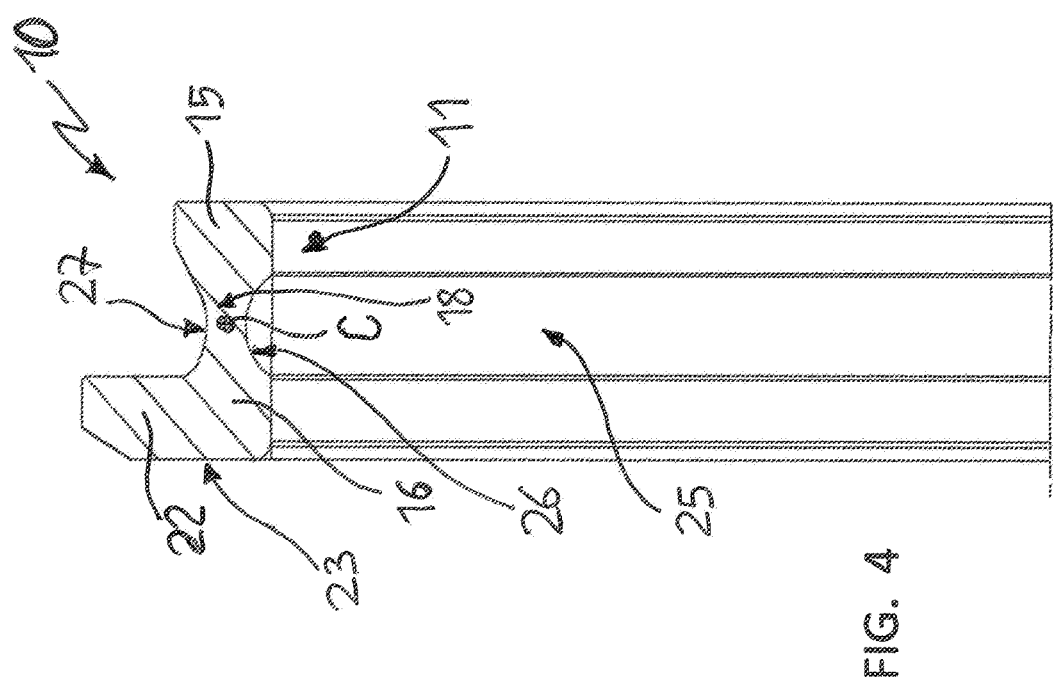
FIG. 4 is a broken-away, enlarged axial cross-sectional view of an upper portion of an annular insert of the backing ring assembly, shown in an orientation opposing that of FIG. 2.

As discussed above, the backing ring assembly 1 includes the annular insert 10, which has an L-shaped radial section (i.e., L-shaped axial cross-sections), that acts or functions as a "locking ring" for securing the backing ring 7 onto the axle 2, as discussed in detail below. The annular insert 10 includes a sleeve portion 11 that is fitted radially and externally to a cylindrical lateral surface 12 of the backing ring 7, as best shown in FIGS. 2 and 3. The cylindrical lateral or "outer cylindrical" surface 12 radially and externally delimits or bounds a first axial section 13 of the backing ring 7. Further, the inside of the first axial section 13 of the backing ring 7 is at least partially delimited radially by a curved annular surface 14 designed to fit with, i.e., disposable against, the curved connecting section 6 of the axle 2.

Preferably, the annular insert 10 is designed to have a lower yield strength than the backing ring 7 and is also preferably made of a second steel (or other metal alloy) that has a lower yield strength than the steel or other material used to form or fabricate the backing ring 7. To achieve this result, the sleeve portion 11 preferably includes a first axial section 15 and a second axial section 16 of substantially the same radial thickness, and a radially thinner or "reduced thickness" section 18 extending between and deflectably or "hingedly" connecting the first and second axial sections 15, 16. More specifically, according to an important aspect of the present invention, the reduced thickness section 18 of the annular insert 10 is designed to form a plastic hinge C (as indicated in FIG. 3) about which the two opposing axial sections 15 and 16 can radially deflect or rotate relatively in the manner of two ends of a rocker arm. Such deflection or rotation is reversible when the elastic limit of the material used to make the annular insert 10 is not exceeded, i.e., the insert 10 is elastically deformed. However, such relative rotation/deflection may be "irreversible" or permanent in the sense that the two axial sections 15 and 16 of the sleeve portion 11, which are normally coaxial, are thereafter permanently arranged at an angle (of up to a few degrees) with respect to each other when the yield strength of the annular insert material is exceeded locally within the reduced thickness section 18, causing permanent or plastic deformation.

Further, when the annular insert 10 is installed on the backing ring 7, the first axial section 15 of the sleeve portion 11 of the insert 10 projects axially cantilevered from the first section 13 of the backing ring 7, as shown in FIGS. 2 and 3. More specifically, the first axial section 15 of the sleeve portion 11 projects axially cantilevered from the first section 13 of the backing ring 7 and axially from the reduced thickness section 18 of the sleeve portion 11, i.e., immediately axially spaced from the reduced thickness section 18 in relation to the backing ring 7. Furthermore, the second axial section 16 of the sleeve portion 11, which is axially opposite the first section 15, engages with the outer cylindrical surface 12 of the backing ring 7, preferably by means of an interference fit.

According to one aspect of the invention, the radially reduced thickness section 18 of the sleeve portion 11 of the annular insert 10 is arranged to face (and is disposed around) the cylindrical lateral outer surface 12 of the backing ring 7 over most of the axial extent of the reduced thickness section 18. As used herein, the expression "over most of the axial extent" means more than 50% of the axial extent, and preferably more than 70% of the axial extent, of the reduced thickness section 18 extends over and is disposed around the cylindrical outer surface 12.

According to another important aspect of the invention, the cylindrical outer, lateral surface 12 of the backing ring 7, which delimits the first axial section 13 thereof, has a frontal edge 20 and a radially-outwardly extending annular projection 19 formed adjacent to the frontal edge 20, for reasons discussed below.

Further, the backing ring 7 also includes a second, flange-shaped axial section 21 adjacent to the first axial section 13 of the backing ring 7 and opposite of the frontal edge 20 of the first axial section 13. More specifically, the second axial section 21 of the backing ring 7 projects radially cantilevered, and radially outwardly from, the outer cylindrical, lateral surface 12 delimiting the backing ring first axial section 13.

According to an aspect of the invention and as detailed below, the annular projection 19 is designed to cause an elastic deformation of the reduced thickness section 18 between the ring 7 and the insert 10 at the time of axial coupling. That is, the projection 19 is configured to induce elastic deformation of the reduced thickness section 18 of the sleeve portion 11 during assembly of the annular insert 10 to the backing ring 7. As such, the deflection caused by the projection 19 enables the second section 16 of the sleeve portion 11 to form an interference fit with the cylindrical outer lateral surface 12 of the axial section 13 of the backing ring 7 when the axial section 16 "snaps over" the annular projection 19 during assembly. In other words, the second axial section 16 of the annular insert sleeve portion 11 snaps over the projection 19 during axial displacement of the insert 10 over the backing ring first section axial section 13 and the axial section 16 engages with the outer cylindrical surface 12 with an interference fit.

Furthermore, the annular insert 10 preferably also has a flange portion 22 that projects radially cantilevered from the second axial section 16 of the sleeve portion 11, so as to extend radially outwardly and away from the axial section 13 of the backing ring 7, as best shown in FIG. 3. The flange portion 22 of the insert 10 extends parallel to and is disposed against the second, flange-shaped axial section 21 of the backing ring 7.

According to an aspect of the present invention, the flange portion 22 of the annular insert 10 is also designed to apply elastic bending stresses to the reduced thickness section 18 of the sleeve portion 11 when axial loading is applied to the flange portion 22. More specifically, the flange portion 22 has a front flat radial surface 23 that is designed to cooperate in contact with, i.e., is disposed against, a corresponding rear flat radial surface 24 of the flange-shaped axial section 21 of the backing ring 7. The rear radial surface 24 of the backing ring second axial section 21 extends perpendicular to the outer cylindrical lateral surface 12 of the backing ring 7.

However, once the ring 7 has been fitted to the insert 10, or vice-versa, the reduced thickness section 18 of the insert 10 enables the flange front surface 23 of the insert 10 to be arranged or oriented not entirely perpendicular to the lateral surface 12, as would be the norm, and therefore not entirely parallel with the rear radial surface 24 of the backing ring second axial section 21. As a result, when in use, the two facing radial surfaces 23 and 24 may cooperate with one another by means of partial contact, i.e., contact that does not extend over the entire length of either surface 23 or 24.

According to another aspect of the present invention, the annular projection 19 is preferably entirely seated inside an inner annular groove 25 of the annular insert 10, which radially inwardly delimits the reduced thickness section 18 of the insert 10. More specifically, in the preferred embodiment shown, the annular projection 19 is arranged immediately adjacent to the first axial section 15 of the sleeve portion 11, entirely faces the reduced thickness section 18, and is disposed inside the groove 25.

According to a further aspect of the present invention, once the backing ring 7 and the annular insert 10 have been fitted to each other and to the axle 2, the annular projection 19 is also configured to prevent an elastic deformation of the reduced thickness section 18 sufficient to permit the annular projection 19 from displacing out of the groove 25. Such retention of the projection 19 within the groove 25 occurs even if the annular retainer 10 is subjected to relatively high axial stress, thereby ensuring a permanent and secure connection (breakage notwithstanding) between the backing ring 7 and the annular insert 10.

Furthermore, the sleeve portion 11 of the retainer 10 is preferably formed such that the reduced thickness section 18 is delimited or bounded radially inwardly over the entire axial extent thereof by a first curved annular surface 26, which delimits and forms the groove 25, and is delimited/bounded radially outwardly over the entire axial extent thereof by a second curved annular surface 27. Preferably, the first and second curved annular surfaces 26, 27 have different radii of curvature and opposite curvatures; that is, the first curved annular surface 26 has a radius of curvature that is different than the radius of curvature of the second curved annular surface 27 and each radius of curvature extends from a separate center (neither shown) located on opposing radial sides of the annular insert 10. Further, the elastic-plastic properties of the plastic hinge C formed by the reduced thickness section 18 can be determined by appropriately selecting the radii of curvature of the surfaces 26 and 27 during the design phase.

The first axial section 15 of the sleeve portion 11 is designed to always form an interference fit with the enlarged section 5 of the axle 2, as depicted in FIG. 3, within a full range of allowable dimensional tolerances for the dimensions of the axle section 5 (e.g., the outside diameter of the enlarged section 5), and to mechanically stress, elastically and/or at yield/plastically, the reduced thickness section 18 for a gradually increasing maximum interference with the enlarged section 5 within the range of allowable dimensional tolerances thereof. In other words, according to this aspect of the invention, the axle enlarged section 15 is dimensioned such that when the outside or external diameter of the enlarged section 5 is the smallest value permissible within the relevant tolerance range (for example, as a result of a worn axle 2), the insert 10 will engage the section 5 with an interference fit having a minimum amount of interference.

However, when the external diameter of the enlarged section 5 is greater than the minimum diameter permissible within the relevant tolerance range (for example in the case of a less worn axle 2) and up to the maximum diameter permissible within the relevant tolerance range (i.e., in the case of a new and therefore unworn axle 2), the annular insert 10 will engage with the axle enlarged section 5 with an interference fit (up to a maximum amount of interference). With a greater amount of interference, the reduced thickness section 18 of the annular insert 10 may experience a small amount of plastic or elastic deformation, with a consequent slight rotation of the flanged portion 22 of the insert 10. Such behaviour of the annular insert 10 ensures that any play or looseness that may be present in any permissible tolerance condition is absorbed by the partial elastic or plastic deformation of the reduced thickness section 18, thereby ensuring a constant and reliable performance of the backing ring 7 over a period of use.

For similar reasons, at least a section of the curved inner annular surface 14, which at least partially radially inwardly delimits the first axial section 13 of the backing ring 7, has a spherical surface with a profile mating with the curved connecting section 6 of the axle 2.

According to a final aspect of the invention, the backing ring 7 is delimited radially internally by both the curved annular surface 14 and by an annular section 28 having a conical surface with a tapering facing the side opposite to the curved annular surface 14. As used herein, the term "tapering" shall be understood to mean the position of the ideal vertex of the conical surface section 28. More specifically, the conical surface section 28 is arranged immediately adjacent to the curved annular surface 14 so as to delimit radially inwardly at least a portion of the second axial section 21 of the backing ring 7.

Further, the second axial section 21 of the backing ring 7 is also provided with a counter bore 29 on the side opposite to the conical surface section 28. The counter bore 29 is delimited radially outwardly by a radially internal cylindrical lateral surface 30, which is configured to form an interference fit with a spacer ring/wear ring 8 of the railway axle 2 interposed between the backing ring 7 and the rolling bearing 4.

The combination of the above-described features enables the backing ring assembly 1 to optimize the pressure contact of the backing ring 7 itself to prevent the ingress of water. Furthermore, accidental disassembly of the two components of the backing ring assembly 1, that is, the annular insert 10 and the backing ring 7, is prevented by the special retaining "tooth" provided by the annular projection 19.

Since axles used for railway freight transport are expected to have a relatively long service life and each axle typically experiences several bearing replacements, the areas where the bearings are assembled are subject to wear. To enable new bearings to be assembled onto worn axles, a specific device is required to offset or compensate for the diameter differences between the rabbet of the bearing and the collar of the axle. According to the present invention, such a device is provided by the backing ring assembly 1 of the present invention as described in detail above, which comprises two parts: the backing ring 7 and the L-shaped insert 10 that acts like a rocker arm to offset the differences in diameter and to optimize the contact pressure between the two components 7 and 10. The backing ring 7 has a collar formed by the first axial section 13 of the ring 7 and is coupled with the insert 10. The coupling of the annular insert 10 and the backing ring 7 is a driven interference fit, and the retaining projection 19 is formed on the portion of the backing ring 7 "turned towards" (and adjacent to) the enlarged section 5 of the axle 2 to prevent accidental disassembly of the backing ring assembly 1 during use.

The advantages of the present invention include the "L" shape of the annular insert 10, which optimizes contact thereof with the backing ring 7 to prevent the ingress of water, and the retaining annular projection 19 on the backing ring 7, which prevents disassembly of the insert 10 during use. As such, all of the objectives of the present invention are therefore achieved.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A railway axle assembly comprising:
an axle having a journal, an enlarged section with an outer cylindrical surface and a curved connecting section extending between the journal and the enlarged section,
a rolling bearing mounted on the journal,
a backing ring disposed axially between the bearing and the enlarged section of the axle, the backing ring receiving axial loading from the rolling bearing and having a first axial section radially delimited by an outer cylindrical surface and an inner curved annular surface, the inner curved surface being disposeable against the curved connecting section of the axle;
an annular insert securing the backing ring onto the axle, having L-shaped axial cross-sections and formed entirely of a material having a yield strength less than a yield strength of the material of the backing ring, the annular insert including a sleeve portion with a first axial section, a second axial section and a reduced thickness section configured to hingedly connect the first axial section and the second axial section, the first axial section of the sleeve portion projecting axially cantilevering from the first axial section of the backing ring and configured to engage with the enlarged section of the axle and the second axial section of the sleeve portion being configured to engage with the outer cylindrical surface of the backing ring with an interference fit,
wherein the outer cylindrical surface of the first axial section of the backing ring has a frontal edge disposed adjacent to the enlarged section of the axle and an annular projection located adjacent to the frontal edge, the annular projection extending radially outwardly and being configured to induce elastic deformation of the reduced thickness section of the annular insert sleeve portion during assembly of the annular insert onto the backing ring such that the second axial section of the sleeve portion snaps over the projection and engages with the outer cylindrical surface of the backing ring with an interference fit,
wherein the backing ring includes a second axial section adjacent to the first axial section of the backing ring and projecting radially outwardly from the outer cylindrical surface of the first axial section of the backing ring and shaped as a flange, and
wherein the sleeve portion of the annular insert has a groove radially inwardly delimiting the reduced thickness section of the sleeve portion and the annular projection of the backing ring is disposed entirely within the groove, located adjacent to the first axial section of the sleeve and configured to prevent an elastic deformation of the reduced thickness section of the annular insert sufficient to permit the projection from displacing out of the groove.

2. The axle assembly according to claim 1, wherein the reduced thickness section of the sleeve portion of the annular insert has an axial extent disposed substantially about the outer cylindrical surface of the backing ring.

3. The axle assembly according to claim 1, wherein the reduced thickness section of the sleeve portion of the annular insert is bounded radially inwardly by a first curved annular surface and is bounded radially outwardly by a second curved annular surface, the first curved annular surface having a radius of curvature that is different than a radius of curvature of the second curved annular surface and the first and second annular surfaces facing in opposing radial directions.

4. The axle assembly according to claim 1, wherein the first axial section of the sleeve portion is configured to engage with the enlarged section of the axle with an interference fit within a range of dimensional tolerances of the axle enlarged section such that elastic stresses within the reduced thickness section of the sleeve portion increases with increasing interference between the sleeve portion first axial section and the axle enlarged section.

5. The axle assembly according to claim 1, wherein:
the backing ring includes a second axial portion adjacent to the first axial section and having a flange section extending radially outwardly from the cylindrical outer surface of the first axial section; and
the annular insert includes a flange portion extending radially outwardly from the second axial section of the sleeve portion and disposed adjacent to the flange section of the second axial section of the backing ring.

6. The axle assembly according to claim 5, wherein the flange portion of the second axial section of the backing ring has a rear flat radial surface and the flange portion of the first axial section of the annular insert has a front flat radial surface disposed against the rear radial surface of the backing ring, the flange portion of the annular insert being configured to generate elastic bending stresses within the reduced thickness section of the sleeve portion when axial loading is applied to the annular insert flange portion.

7. The axle assembly according to claim 1, wherein the inner curved annular surface of the first axial section of backing ring has at least a section with a spherical profile mating with the curved connecting section of the railway axle.

8. The axle assembly according to claim 1, wherein the backing ring has a second axial section with an inner counter bore configured to receive a ring disposed between the backing ring and the rolling bearing, the counter bore having an inner cylindrical surface configured to frictionally engage with the ring, and an inner conical surface section extending axially between the inner curved annular surface of the backing ring first axial section and the counter bore and radially inwardly delimiting the second axial section of the backing ring.

9. The axle assembly according to claim 1, wherein the first and second axial sections and the reduced thickness section of the sleeve portion are each sized and configured such that at least seventy percent of the entire axial extent of the reduced thickness section is disposed about the outer cylindrical surface of the backing ring.

* * * * *